United States Patent
Gerhard et al.

(10) Patent No.: US 11,845,556 B2
(45) Date of Patent: Dec. 19, 2023

(54) ENERGY ABSORPTION DEVICE FOR A SEAT OF A VEHICLE AND SEATING SYSTEM WITH SUCH AN ENERGY ABSORPTION DEVICE

(71) Applicant: Autoflug GmbH, Rellingen (DE)

(72) Inventors: Matthias Gerhard, Wulfsen (DE); Nick Ketelsen, Kiel (DE); Marvin Bocklage, Hamburg (DE); Mattia Testard, Hamburg (DE); Mislav Blazic, Hamburg (DE); Ole Frederik Hubald, Hamburg (DE)

(73) Assignee: AUTOFLUG GMBH, Rellingen (DE)

( * ) Notice: Subject to any disclaimer, the term of this patent is extended or adjusted under 35 U.S.C. 154(b) by 0 days.

(21) Appl. No.: 17/682,090

(22) Filed: Feb. 28, 2022

(65) Prior Publication Data

US 2022/0274710 A1    Sep. 1, 2022

(30) Foreign Application Priority Data

Mar. 1, 2021   (EP) ..................... 21159925

(51) Int. Cl.
*B60N 2/42* (2006.01)
*B64D 11/06* (2006.01)
*B60N 2/427* (2006.01)

(52) U.S. Cl.
CPC ........ *B64D 11/0619* (2014.12); *B60N 2/4242* (2013.01); *B60N 2/42709* (2013.01)

(58) Field of Classification Search
CPC ........................ B64D 11/0619; B60N 2/4242
See application file for complete search history.

(56) References Cited

U.S. PATENT DOCUMENTS

| | | | |
|---|---|---|---|
| 5,657,950 A | 8/1997 | Han et al. | |
| 5,699,984 A | 12/1997 | Pinault | |
| 6,820,931 B2* | 11/2004 | Ruff .................. | B60N 2/42736 297/216.17 |
| 7,822,522 B2* | 10/2010 | Wereley ............. | B64D 11/0619 297/303.4 |
| 7,878,312 B2* | 2/2011 | Hiemenz ............. | B60N 2/4242 188/267.2 |
| 8,616,637 B2* | 12/2013 | Trimble ............. | B64D 11/0696 297/216.19 |

(Continued)

FOREIGN PATENT DOCUMENTS

| | | |
|---|---|---|
| CN | 108248868 B | 11/2020 |
| EP | 1197429 A2 | 4/2002 |

OTHER PUBLICATIONS

"Examination Report for European Patent Application No. 21159925.3", dated Aug. 17, 2023, 5 pages.

(Continued)

*Primary Examiner* — Philip F Gabler
(74) *Attorney, Agent, or Firm* — CALFEE, HALTER & GRISWOLD LLP

(57) ABSTRACT

The present invention relates to an energy absorption device for a seat of an aircraft, in particular of a helicopter, with
at least one impact mechanism (2, 4) and
at least one energy absorber (1) coupled with the impact mechanism (2, 4), wherein the impact mechanism (2, 4) acts on the energy absorber (1) for the energy absorption at least in the case of a crash.

7 Claims, 3 Drawing Sheets

(56) References Cited

U.S. PATENT DOCUMENTS

Figure 1:
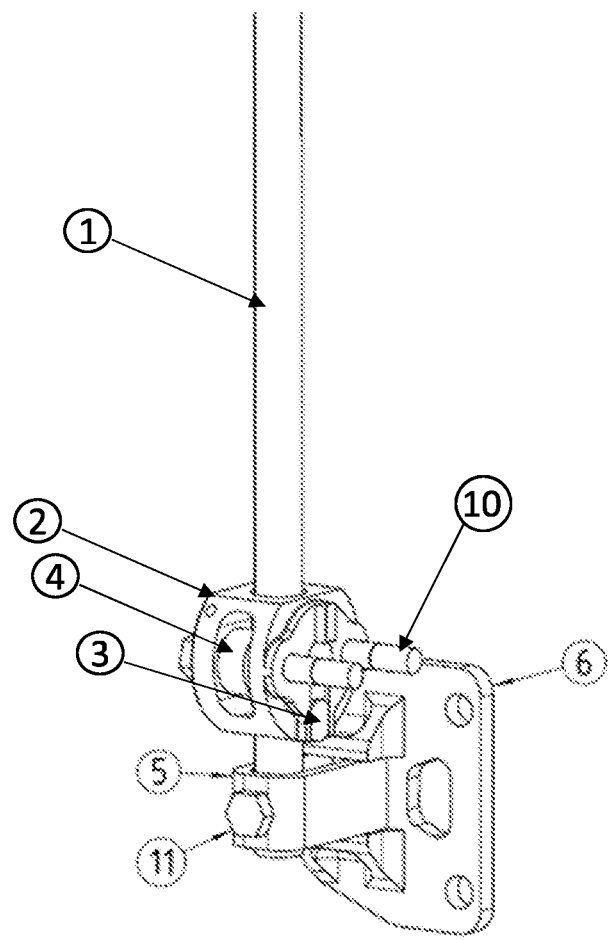

| | | | |
|---|---|---|---|
| 8,939,502 B2* | 1/2015 | Grant | B60N 2/0232 |
| | | | 297/216.16 |
| 9,973,113 B1* | 5/2018 | Lou | H10N 30/306 |
| 10,272,863 B1* | 4/2019 | Desjardins | B64D 11/0619 |
| 2010/0219667 A1* | 9/2010 | Merrill | B60R 22/195 |
| | | | 297/480 |
| 2011/0079681 A1 | 4/2011 | Honnorat | |
| 2014/0339866 A1* | 11/2014 | Olivares | B60N 2/24 |
| | | | 297/216.17 |
| 2020/0339264 A1 | 10/2020 | Baldomero | |

OTHER PUBLICATIONS

"European Search Report for European Patent Application No. 21159925.3", dated Aug. 11, 2021, 7 pages.

* cited by examiner

ENERGY ABSORPTION DEVICE FOR A SEAT OF A VEHICLE AND SEATING SYSTEM WITH SUCH AN ENERGY ABSORPTION DEVICE

The present invention relates to an energy absorption device for a seat of a vehicle, in particular of an aircraft such as a helicopter, with at least one impact mechanism and at least one energy absorber connected to the impact mechanism, wherein the impact mechanism acts on the energy absorber for the energy absorption at least in the high-load case such as a helicopter crash.

The invention also relates to a seating system for vehicles, in particular for aircrafts such as helicopters, with a frame which can be fastened to the vehicle, a seat mounted displaceably on the frame and an energy absorption device with the aforementioned features, wherein the seat is firmly connected to an element of the energy absorption device such that, in the case of acceleration caused for example by a crash (high-load case), a displacement of the seat along the frame is cushioned by the energy absorption device, in that the impact mechanism acts on the energy absorber for energy absorption.

The energy absorber can for example be constituted as a tube, a square profile or a T-profile, which is preferably guided by/passed through the impact mechanism. The energy absorber can also be constituted as a steel band, a rod or suchlike.

The impact mechanism can for example comprise a cage, in which preferably at least one roller is mounted rotatably as a component of the impact mechanism. The impact mechanism can alternatively comprise a die, which is preferably arranged in a cage. A gap with a gap width is formed by the cage, the die or between a roller and the cage or preferably between two rollers mounted rotatably in the cage, through which gap the energy absorber can be passed. Outside the gap, the energy absorber constituted for example as a tube has a cross-sectional width which is greater than the gap width. In the case of the formation of two rollers, between which the energy absorber is arranged, it is known for example that the tube comprises notches, in which the rollers are arranged in the initial state.

Provision can be made such that the seat mounted displaceably on the frame is fixedly connected for example to the cage of the impact mechanism or to the energy absorber, wherein the energy absorber is correspondingly fixedly connected to the frame or the impact mechanism is fixedly connected to the frame.

The energy absorption device is constituted with its components in such a way that, in a high-load case such as in a crash, at least when a passenger is sitting on the seat, the seat is moved along the frame. During this movement of the seat caused by the impact of the vehicle, the energy absorber is moved relative to the impact mechanism, wherein the energy absorber dissipates the energy in particular by deformation. Thus, for example, in the case where the energy absorber is constituted as a tube, this tube is rolled flat between two rollers mounted on the cage. A passenger can thus be protected against excessively strong force effects.

An energy absorption device is known for example from EP 3 183 171 B 1. The height of the force at which the energy absorber is moved relative to the impact mechanism and thus also the energy absorption begins is usually adjusted based on the properties of the components of the energy absorption device also participating in the energy absorption. Thus, the critical release force can be adjusted for example based on the gap width, the wall thickness of the tube or the material of the tube. The critical release force should in particular be adjusted such that the energy absorption is not yet exceeded in relatively small-load cases (such as for example during hard landings or during regular operation).

It has been shown that, during normal operation, the properties (for example due to vibrations or hard landings) of the components of the energy absorber and/or the impact mechanism change. Thus, it has been shown that cold welds of the rollers and the tube can occur. In particular, a material build-up can occur at the edge of the notch on the tube, as a result of which the critical release force is changed. However, this critical release force is in direct correlation with the loads which are acting on a passenger's spine.

The problem of the present invention, therefore, is to eliminate the drawbacks described in respect of the prior art and in particular to specify an energy absorption device with which the critical release force is not changed by the influences occurring during normal use.

A solution to this problem is indicated by an energy absorption device with the features of claim 1. Advantageous embodiments of the energy absorption device are indicated in the dependent claims and in the preceding and subsequent description, wherein individual features of the advantageous embodiments can be combined with each other in a technically meaningful way. The energy absorption device is used in particular in a seating system for vehicles, such as is described in claim 8 and the corresponding description.

The energy absorption device thus comprises in particular at least one impact mechanism and an energy absorber coupled with the impact mechanism, wherein the impact mechanism acts on the energy absorber at least in the high-load case (as in the case of a helicopter crash) for energy absorption.

It is proposed that the energy absorber and the impact mechanism are connected to one another in the initial state by a fixing element, in such a way that a relative movement between the energy absorber and the impact mechanism is minimised or prevented in normal operation. The separate fixing element, therefore, is in particular arranged directly between the energy absorber and the impact mechanism, so that the latter cannot move towards one another (up to minimal dimensions established by tolerances). It is thus preferably also made possible for the energy absorber and the section of the impact mechanism lying directly adjacent to the energy absorber in the high-load case to be spaced apart from one another in the initial state. However, this also thus prevents the impact mechanism and the energy absorber from acting on one another in normal operation (for example due to vibrations or due to hard landings). A change in the critical release force during normal operation is thus prevented.

In particular, it is proposed that the fixing element has at least one predetermined breaking point, at which the fixing element breaks in the high-load case, so that the impact mechanism and the energy absorber can move relative to one another in the high-load case. The predetermined breaking point is therefore an intentionally provided weakening of the fixing element, which is dimensioned such that the fixing element receives the loads in normal operation. The predetermined breaking points can for example be a notch in the material of the fixing element or any intentionally provided weakening. Such a weakening can be achieved in particular by a suitable material combination (rigid/brittle) or speed-dependent material parameters. By means of the dimensioning of the predetermined breaking point, however, the critical release force can also be directly predefined. When the critical release force is reached in a high-load case, the fixing element breaks at the predetermined breaking point, so that the energy absorber can move relative to the impact mechanism, wherein energy is dissipated by the energy absorber with this movement.

A component is provided with the fixing element comprising a predetermined breaking point, with which the critical release force can be adjusted independently of the properties of the components involved in the energy absorption. However, the critical release force can thus also be adjusted in a targeted manner to different seat models and weights of passengers, without influencing the remaining course of the energy absorption by the energy absorber. For example, the rollers or the dies of the impact mechanism can also have a smaller diameter or also the energy absorber itself can comprise a different material or have a smaller thickness, as a result of which the energy absorption can be optimised. The energy absorption device can thus easily be adapted to different seating systems via the fixing element.

Whilst it is in principle sufficient for the fixing element to have precisely just one predetermined breaking point, provision is made in a preferred embodiment such that the fixing element comprises at least two or precisely two predetermined breaking points. The fixing element can thus be firmly connected with its two ends to the impact mechanism (for example to the cage of the impact mechanism), while the fixing element engages with a middle section through the energy absorber (for example the tube). The predetermined breaking points are arranged on the fixing element in such a way that the latter breaks outside the energy absorber in the high-load case.

The fixing element can be constituted for example as a shearing bolt, which is mounted with its ends in the cage of the impact mechanism and engages through the tube (as energy absorber).

Figure 2:
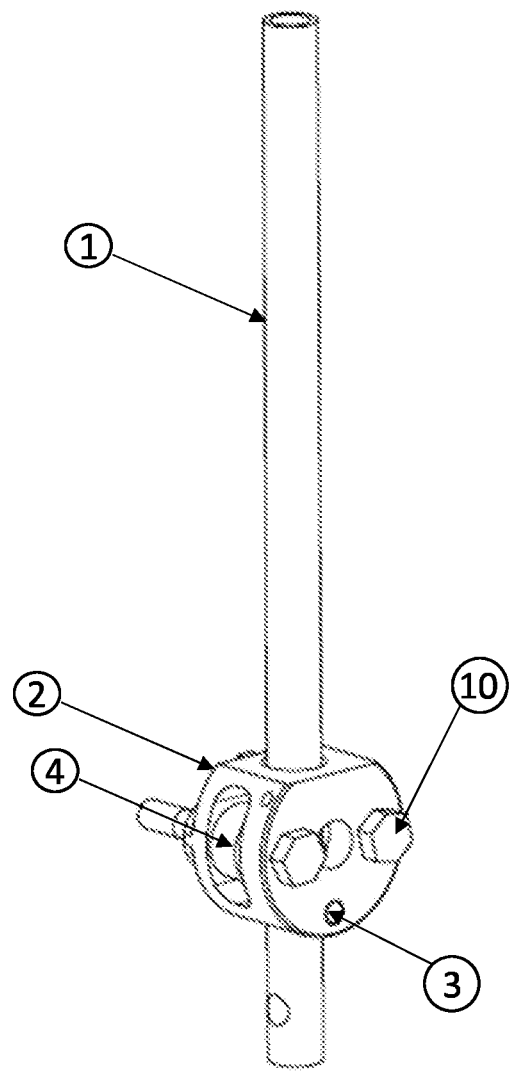

The invention and the technical background are explained below by way of example with the aid of the figures. They show schematically FIG. 1: an energy absorption device in a perspective view, FIG. 2: components of the energy absorption device in a perspective view and FIG. 3: an exploded representation of the energy absorption device.

The energy absorption device depicted in the figures for a seating system of a helicopter comprises an energy absorber 1 constituted as a tube, an impact mechanism and a connection element 6.

The connection element 6 is fitted to a seat pan not represented in the figures, whilst the impact mechanism yet to be described below in greater detail is connected to a frame of a seating system, with which energy absorber 1 runs in parallel. The energy absorber 1 is in any case connected by means of a screw 11 to a bracket 5 of the connection element.

Figure 3:
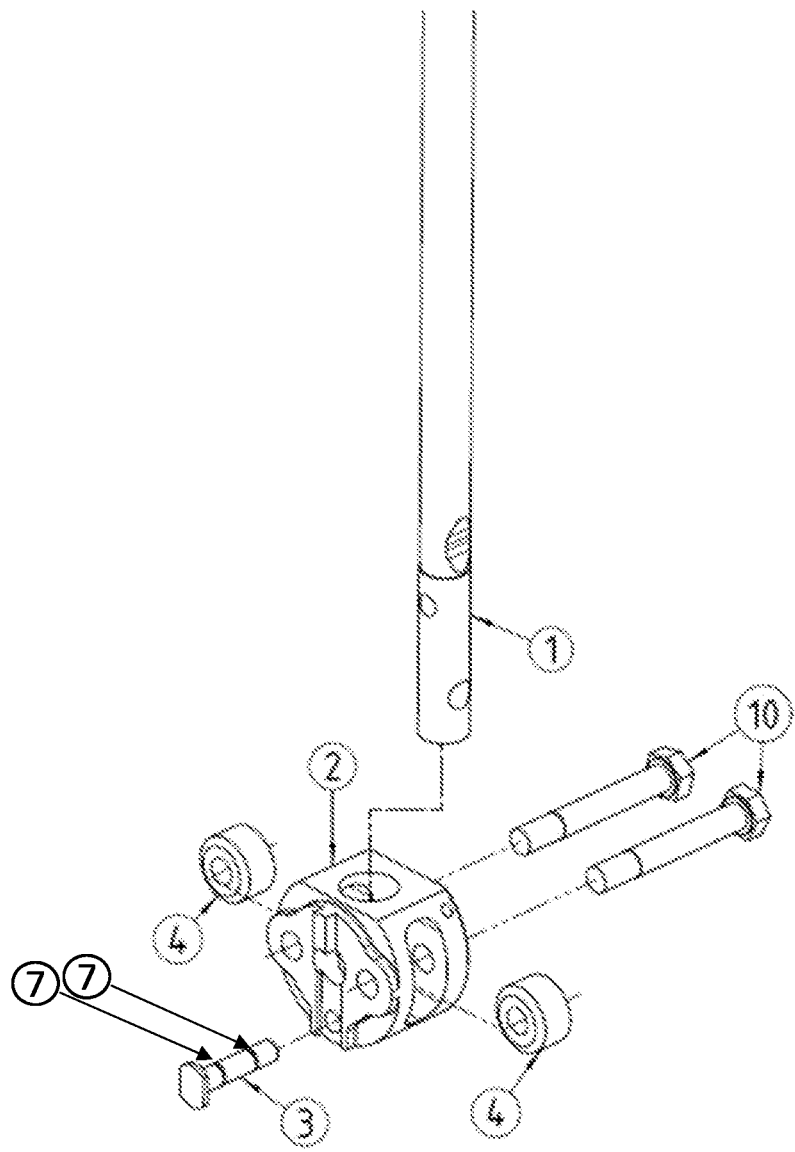

As emerges in particular from the exploded representation of FIG. 3, the impact mechanism comprises a cage 2 and two rollers 4 rotatably mounted on cage 2. The rollers 4 are mounted rotatably in cage 2 by means of screws 10, wherein screws 10 can also be used at the same time for fitting cage 2 to a frame (not represented) of a seating system. A gap is formed between rollers 4. In the assembled state, energy absorber 1 is arranged in cage 2 in such a way that rollers 4 are each arranged in a notch in energy absorber 1.

Moreover, a fixing element 3 is provided, the two predetermined breaking points 7 of which can be seen in FIG. 3. In the assembled state represented in FIGS. 1 and 2, fixing element 3 constituted as a shearing bolt engages through an opening in energy absorber 1, while fixing element 3 is mounted with its ends in cage 2. The fixing element 3 is dimensioned such that energy absorber 1 and cage 2 cannot move relative to one another during normal operation of the helicopter (vibrations or hard landings).

The predetermined breaking points 7 on fixing element 3, on the other hand, are dimensioned such that the fixing element 3 can break at the predetermined breaking points 7 in the event of a crash. A critical release force is thus predefined by predetermined breaking points 7. Following the release/breaking, the energy absorber 1 connected via the connection element 6 to a seat pan is pulled through cage 2, wherein the rollers 4 flatten the energy absorber 1 during this relative movement between the energy absorber 1 and the cage 2, so that energy applied from a passenger sitting on the seat pan is absorbed.

Fixing element 3 comprising the predetermined breaking points 7 thus provides a separate component, by means of which the critical release force can be adjusted independently of the components involved in the energy absorption.

LIST OF REFERENCE NUMBERS 1 energy absorber
2 cage
3 fixing element
4 roller
5 bracket
6 connection element
7 predetermined breaking point
10 screw
11 screw

The invention claimed is:

1. An energy absorption device for a seat of a vehicle, with
at least one impact mechanism (2, 4) and
at least one energy absorber (1) coupled with the impact mechanism (2, 4), wherein the impact mechanism (2, 4) acts on the energy absorber (1) for energy absorption at least in a high-load case, wherein the impact mechanism (2, 4) forms a gap with a gap width and the energy absorber (1) has a cross-sectional width outside the impact mechanism which is greater than the gap width, wherein
the energy absorber (1) and the impact mechanism (2, 4) are connected to one another in an initial state by a fixing element (3), in such a way that a relative movement between the energy absorber (1) and the impact mechanism (2, 4) is minimised or prevented in normal operation, wherein the fixing element (3) has at least one predetermined breaking point (7), at which the fixing element (3) breaks in the high-load case, so that the impact mechanism (2, 4) and the energy absorber (1) can move relative to one another in the high-load case.

2. The energy absorption device according to claim 1, wherein the fixing element (3) is constituted as a shearing bolt.

3. The energy absorption device according to claim 1, wherein the energy absorber (1) is constituted as a tube.

4. The energy absorption device according to claim 1, wherein the impact mechanism comprises a cage (2).

5. The energy absorption device according to claim 4, wherein at least one roller (4) as a component of the impact mechanism is mounted rotatably on the cage (2).

6. The energy absorption device according to claim 3, wherein the diameter of the tube outside the impact mechanism (2, 4) is greater than inside the impact mechanism (2, 4).

7. A seating system for vehicles, with
a frame which can be fastened in the vehicle,
a seat mounted displaceably on the frame and
an energy absorption device with
    at least one impact mechanism (2, 4) and
    at least one energy absorber (1) coupled with the impact mechanism (2, 4), wherein the impact mechanism (2, 4) acts on the energy absorber (1) for energy absorption at least in a high-load case, wherein the impact mechanism (2, 4) forms a gap with a gap width and the energy absorber (1) has a cross-sectional width outside the impact mechanism which is greater than the gap width, and wherein
    the energy absorber (1) and the impact mechanism (2, 4) are connected to one another in an initial state by a fixing element (3), in such a way that a relative movement between the energy absorber (1) and the impact mechanism (2, 4) is minimised or prevented in normal operation, wherein the fixing element (3) has at least one predetermined breaking point (7), at which the fixing element (3) breaks in the high-load case, so that the impact mechanism (2, 4) and the energy absorber (1) can move relative to one another in the high-load case, wherein the seat is firmly connected to an element of the energy absorption device such that, in the case of acceleration caused by the high-load case, a displacement of the seat along the frame is cushioned by the energy absorption device, in that the impact mechanism (2, 4) acts on the energy absorber (1) for energy absorption.

* * * * *